United States Patent [19]

Davis et al.

[11] Patent Number: 4,612,637

[45] Date of Patent: Sep. 16, 1986

[54] MULTIPLE-ACCESS COMMUNICATIONS SYSTEM

[75] Inventors: Christopher K. Davis, Cambridge; Paul J. Stein, Crawley; Diana M. Ball, Horley, all of England

[73] Assignee: U.S. Philips Corporation, New York, N.Y.

[21] Appl. No.: 633,547

[22] Filed: Jul. 23, 1984

[30] Foreign Application Priority Data

Aug. 1, 1983 [GB] United Kingdom ............... 8320722

[51] Int. Cl.[4] ............................................... H04J 3/16
[52] U.S. Cl. ................................... 370/95; 370/104
[58] Field of Search ............... 370/94, 95, 85, 89, 370/104, 60

[56] References Cited

U.S. PATENT DOCUMENTS

Re. 28,577 10/1975 Schmidt .......................... 370/95
3,982,077 9/1976 Clark et al. ..................... 370/95

Primary Examiner—Douglas W. Olms
Assistant Examiner—Frank M. Scutch, III
Attorney, Agent, or Firm—William J. Streeter; Leroy Eason

[57] ABSTRACT

A multiple-access communications system for an unlimited user population wherein a system controller continuously transmits Aloha signals on a slot-by-slot basis giving an updated number of time slots available whereby a calling party can select any one of the designated time slots at random. The calling party checks the time slot immediately preceding its selected time slot to ascertain if the current Aloha number is zero (or an equivalent thereof). If it is zero then the calling party reverts to listening for a time slot containing an Aloha number greater than zero. Alternatively if it is not zero the calling party apparatus sends a signal to the system controller in its selected time slot. Multipurpose signalling in each time slot can be carried out by the system controller thereby reducing the overhead on the system and speeding-up the setting-up of calls which may be off-air or non off-air.

5 Claims, 8 Drawing Figures

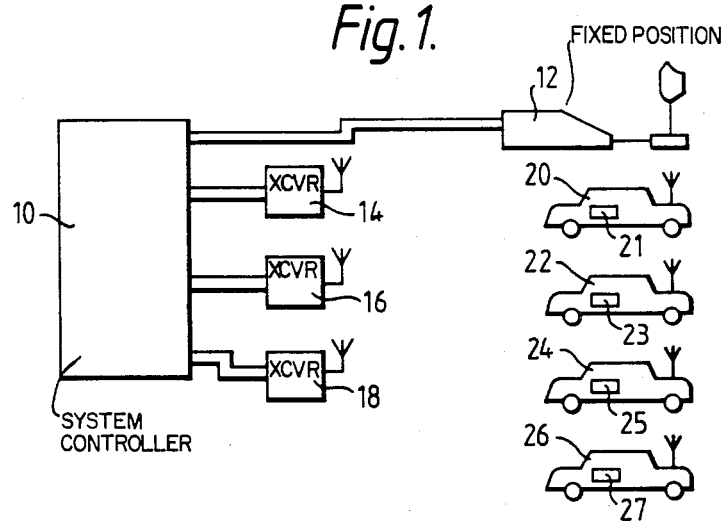
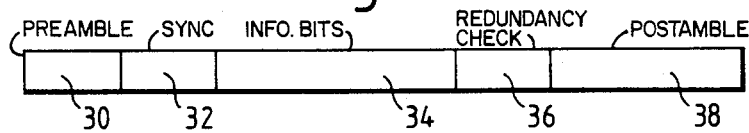
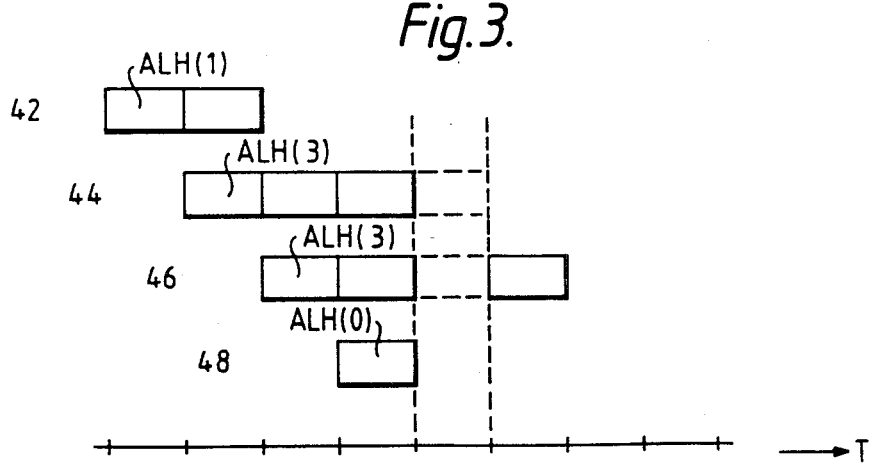

MULTIPLE-ACCESS COMMUNICATIONS SYSTEM

BACKGROUND OF THE INVENTION

1. Field of the Invention

The present invention relates to a multiple-access communications system which has particular, but not exclusive, applications in mobile radio dynamic channel assignment systems, local area networks (LANS) and satellite links. For convenience of description, the invention will be described with reference to mobile radio dynamic channel assignment (trunking) systems but it is to be understood that the same theory applies to other multiple-access communications systems.

2. Description of the Prior Art

Trunking systems are characterised by the problems of many users attempting to gain access to them at the same time. These attempts for access (which can be thought of as requests for service) can clash and in the absence of any form of control can produce an unstable situation where the requests for service arrive at a faster rate than the system can service them. The requests for service are transmitted to a central system control computer hereinafter referred to as a system controller via a signalling channel and the system controller allocates the speech channels according to some predetermined criteria. In the simplest case of a single channel trunking system then the single channel has to be used for signalling and speech.

In order to mitigate these problems controlled multi-access protocols are used to discipline users trying to gain access. Also the throughput, that is the number of successfully serviced requests per unit time, of the system can be increased.

N. Abramson "The Aloha System—Another Alternative for Computer Communications" AFIPS Conference Proceedings 1970 Fall Joint Computer Conference, 37, 281–285 proposed one of the first multi-access protocols termed "Pure Aloha". With this protocol, users transmit a request and wait for some form of acknowledgement of their request from the system controller; if no acknowledgement is heard users wait a random time before re-trying.

The throughput of "Pure Aloha" was doubled by a modified protocol, termed "Slotted Aloha", which allows users to transmit requests only within discrete time slots, each request occupying one complete time slot. In spite of this improved throughput, "Slotted Aloha" nevertheless has practical disadvantages.

With the objective of overcoming these disadvantages, "Slotted Aloha" was extended by a protocol, termed "Framed Aloha", which is disclosed in British Patent Specification No. 2063011A. In Framed Aloha a synchronisation message, termed "Aloha Now", is transmitted by the system controller on the signalling channel at intervals indicating that the immediately following n time slots are available for users to transmit requests (either new requests or re-transmissions after unsuccessful requests) to the system controller via the signalling channel. The number of time slots n is a constant determined at the system design stage. With this protocol the requests are contained within known time frames, simplifying the system control strategy. However a drawback to having a fixed number n of time slots is that it does not take into account the variation in the number of requests between a quiet period and a busy period and this can lead to an unstable situation.

Also in a quiet period when perhaps a single request is received in the first time slot then the caller has to wait until another $(n-1)$ slots have elapsed before the system controller allocates a speech channel to the caller.

An attempt to match the number of time slots available with the number of requests is disclosed in British Patent Specification No. 2069799 and is termed "Dynamic Framelength Aloha". This protocol includes means for dynamically controlling the frame length, that is updating the number n of time slots on a frame-by-frame basis. The number n is calculated by observing the events in the previous frame such as the number of garbled (or clashed), empty and successful slots and also from an estimate of the call arrival rate. By using feed-back control in this way stability is achieved and additionally the access time (the time delay between a user wishing to make a request, and the request being acknowledged) is reduced. Nevertheless there is still a delay between request acknowledgement and speech channel allocation. An experimental trunking system using Dynamic Framelength Aloha is disclosed in an article "A High Efficiency Mobile Radio Trunking System—Performance Evaluation" by C. K. Davis, P. J. Stein, J. de Jager and R. Postema, published in the IEE Conference on Communications Equipment and Systems—Communications '82 Birmingham April 1982, pages 131 to 137.

Although Dynamic Framelength Aloha is a practical system giving a good performance, there is still a demand to make better use of the time available, particularly in busy periods. One way of doing this would be to increase the signalling rate to say 2400 bits/second instead of 1200 bits/second mentioned in the above article and to reduce the length of each time slot from 100 ms to 60 ms. However this may lead to an undesirable increase in the cost and complexity of the system hardware.

An object of the present invention is to make better use of the time available by means of a different protocol to those described so far.

SUMMARY OF THE INVENTION

The multiple-access communications system in accordance with the present invention is characterised in that a system controller continuously transmits framelength signals (the Aloha number) on a slot-by-slot basis giving an updated number of time slots available whereby a calling apparatus can select any one of the designated time slots at random, the calling apparatus checks the time slot immediately preceding its selected time slot to ascertain if the current slot has a zero Aloha number (as herein defined), if it is zero then the calling apparatus reverts to listening for a time slot containing an Aloha number greater than zero, alternatively if it is not zero the calling apparatus sends a signal to the system controller in its selected time slot.

In the present specification a zero Aloha number is intended as a flag to indicate that the following slot is inhibited for multi-access use and has no further significance and may be indicated some other way.

The protocol used by the system made in accordance with the present invention may for convenience of description be called "Dynamic Overlapping Frame Aloha" (or DOFA). In order for DOFA to be able to update the number of available slots, the system controller has to take into accound the recent history of successful requests, empty slots and occurrence of clashes. In this way if uses feedback control to provide stability. The protocol can be used when there is an unlimited user population.

By using a signal format which enables the system controller to transmit a message as well as an Aloha number in one and the same time slot this reduces the signalling overheads and in consequence improves both throughput and access times compared with Dynamic Framelength Aloha. DOFA also provides more flexibility than Dynamic Framelength Aloha by allowing immediate collision-free access to a specified user, that is, single user communication can be embedded within the multiuser protocol.

An algorithm which may be used for calculating by feedback control the number of time slots in each frame comprises:
Keep an extra variable K (the auxiliary Aloha number), and update K as follows:
(a) if the previous slot was available for requests and was observed as "clashed", increase K by $n_1$;
(b) if the previous time slot was available for requests and was observed as successful, decrease K by $n_2$ to a lower limit of one;
(c) in the previous slot was available for requests and was observed as empty, decrease K by $n_3$ to a lower limit of one;
(d) if the previous time slot was reserved for a message from a single user, leave K unchanged;
the Aloha number is then taken as K unless the system controller is reserving the next slot for a specified user, in which case an Aloha number of 0 is sent.

The present invention will now be described, by way of example, with reference to the accompanying drawing.

BRIEF DESCRIPTION OF THE DRAWING

FIG. 1 illustrates in block schematic form an embodiment of a trunking system,

FIG. 2 indicates the different component parts of a single code word,

FIG. 3 illustrates the dynamic overlapping frames of DOFA,

DETAILED DESCRIPTION OF THE PREFERRED EMBODIMENTS

Figure 4:
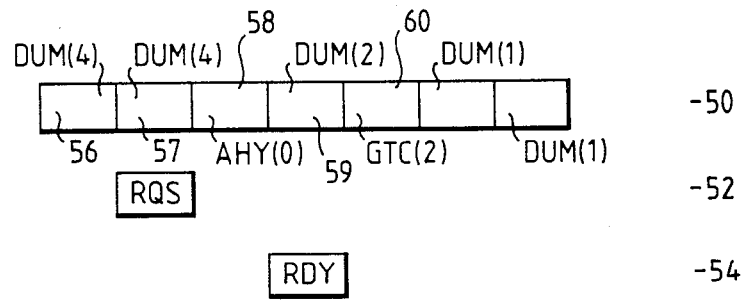
FIGS. 4 to 6 illustrate the signalling between various parties in three different situations.

Referring to FIG. 1, the trunking system comprises a system controller (or central controller) 10 which is coupled by duplex or half-duplex links to a fixed position 12 and to three duplex radio transceivers 14, 16, 18. In the drawing four vehicles 20, 22, 24 and 26 are shown each equipped with a radio transceiver 21, 23, 25 and 27, respectively, capable of maintaining a half-duplex link with any one of the transceivers 14, 16, 18. It is pointed out that there will be many more mobiles than the number of transceivers 14, 16, 18. Communication between mobiles is via the transceivers 14, 16, 18 controlled by the system controller 10 which comprises a computer, modulators and demodulators.

In operation most signalling between the system controller 10 and the mobiles 20, 22, 24 and 26 is done on a signalling (or control) channel, which may not be a dedicated channel. Once a call has been set up by the computer in the system controller 10 then a speech channel is allocated to the mobiles involved in the call. Calls involving mobiles can be arranged on a group or a selected mobile basis. Some signalling, e.g. that necessary to terminate a conversation, takes place on speech channels.

In describing the DOFA protocol it is worth mentioning by way of example a method of formatting of each message. All signalling in the system is transmitted as a binary data stream using fast frequency shift keying (FFSK) at 1200 bits per second, a binary "1" being 1200 Hz and a binary "0" being 1800 Hz. Every message has exactly the same format as illustrated in FIG. 2. The exemplary message comprises 120 bits which can be transmitted at 1200 bits/second in a time slot of 100 ms. The relevant parts of each message are identified by a respective reference numeral. Each message begins with a preamble 30 of 16 bit reversals, viz. binary 101010 . . . , which is required to ensure that the data demodulators in the system controller 10 and the mobiles acquire bit synchronisation. This is immediately followed by a 16 bit synchronisation code word 32 which is used to give framing to the information content of the message. There are different synchronisation code words for control and speech channels. An advantage of having different synchronisation code words is that mobiles recognise the signalling (or control) channel by scanning and looking on each channel for the signalling channel synchronisation code word. Messages being sent on speech channels would slow this process down if the synchronisation code words were the same.

The next part 34 comprises 40 information bits which are divided into Aloha number, message type, and two addresses, generally those of the "calling" and "called" parties.

A 16-bit cyclic redundancy check 36 follows the part 34 and a 32-bit postamble 38 completes the message. The postamble comprises a sequence of bit reversals and normally is only transmitted by a data modulator operating on the signalling (or control) channel.

In DOFA the system controller is continuously updating the number of time slots available, or the Aloha number, based on an analysis of the number of clashes, empty slots and successful slots. This is illustrated in FIG. 3 which shows four frames 42, 44, 46 and 48 plotted against time T. The Aloha number appears in parentheses. For the sake of explanation assume that the frame 48 is not present. As each new frame has an Aloha number of 1 or more, then as far as a user is concerned there is one continuous channel. However the system controller perceives the protocol as a series of overlapping frames. The user can select his time slot at random from the number then available. In the case of the frame 44, the user on detecting an Aloha number of 3 can decide to make his request in for example the third slot and actually do that. However the occurrence of Aloha (0) in the frame 48 means that the next time slot is not available even if a user had selected this time slot in a previous frame. In such a situation the user who in the frame 44 had made the request has to wait until an Aloha number is produced having a value of 1 or more. Another user who had selected the second slot in the frame 46 is in the same situation but a further user who had selected the third slot in the frame 46 can still proceed unless a second Aloha (0) is produced in the frame immediately following the frame 48.

In the presently described example a zero Aloha number (ALH (0)) has been used to inhibit a slot for multi-access use but some other signal such as a flag may serve the same function.

Some examples of DOFA will now be described with reference to FIGS. 4 to 6 of the accompanying drawings. These examples will be described in the context of a mobile radio dynamic channel assignment system but the protocol is applicable to any multi-access communication system (with or without possible transmission errors in single messages).

Figure 5:
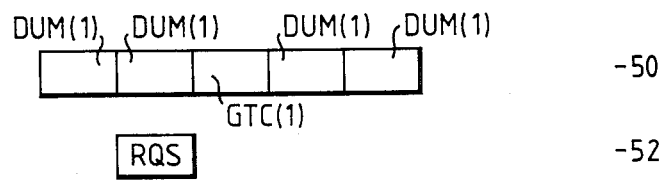
Figure 6:
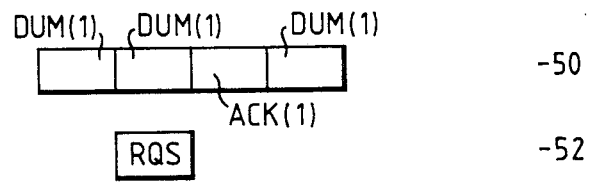

FIGS. 4 to 6 show examples of the signalling which takes place on one radio channel, referred to as the control channel 50, on which all requests from users are gathered in and channel assignments given out. The control channel is duplex, so signalling from the system controller to the mobiles, and the mobiles to the system controller can take place simultaneously. All messages in the system are of equal length and have the format described with reference to FIG. 2, and one message can be sent per time slot. In fact, the actual message is shorter than a time slot and the rest of the time is used for inter-slot processing by the system controller and the mobiles; however this is not relevant to the examples.

The following signalling messages are sent from the system controller to the mobiles:

GTC—Go To Channel. A message instructing the addressed mobiles to switch to the given channel number and commence conversation. Additionally GTC may serve as an acknowledgement to a calling mobile.

ACK—Acknowledge. A call request has been successfully received.

AHY—Ahoy. A message to check on the availability of an addressed mobile. If the particular mobile hears the message, he replies in the next slot with a RDY message. Additionally AHY may serve as an acknowledgement to a calling mobile.

NAV—Not available. The requested mobile was not available.

DUM—Dummy message. Transmitted if there is nothing else to send.

In addition, all messages from the system controller are written with a number in parentheses. This is the Aloha number, which is sent with each message from the system controller and indicates how many following time slots the mobiles should choose from if they wish to transmit a request. If the number is zero then transmission of requests in the next slot is prohibited. The following messages are sent from the relevant mobiles to the system controller.

RQS—Request Speech. A mobile wishes to access the system.

RDY—Ready. Transmitted in response to an AHY message.

All messages except DUM also contain the addresses of both the called and calling parties.

FIG. 4 shows a typical message sequence to set up a call, where the availability of the called party is checked before a channel is assigned. In order to make clear which user is signalling at a particular time, the calling party's call to the system controller is referenced by the line 52 and that of the called party by the line 54.

In FIG. 4 the first message DUM (4) in the slot 56 indicates that an Aloha frame has been started with 4 slots available for requests. Mobiles which have a request to send and have not decided on a slot choose a random number R between 1 and 4 and plan to send RQS in the Rth slot after this one (slot 56), in this example the first slot (R=1). The second slot 57 contains DUM (4) showing that a new Aloha frame has been started, overlapping the first frame. AHY(0) in the third slot 58 interrupts the Aloha structure. This AHY(0) signal serves three purposes. Firstly it acknowledges the RQS from the calling party, secondly it checks on the availability of the called party and thirdly the Aloha parameter of zero cancels any RQS messages planned in the next slot and so prevents other users from transmitting while the called party is transmitting RDY. Note that because of this, calling parties must always hear a non-zero Aloha number in the slot immediately preceding the slot in which they wish to transmit RQS. If the Aloha number is zero, then the calling party waits to hear a non-zero Aloha number and chooses a new slot. If the Aloha number is not zero, then the calling party transmits RQS as planned.

If the system controller hears RDY in the slot 59, GTC is sent in the following slot 60. Some implementations of this protocol may send GTC more than once for reliability. However repeat messages are delayed if there is more important signalling to be sent.

If the system controller fails to hear RDY (for reliability it may make more than one attempt at the AHY/RDY sequence), NAV is transmitted back to the calling party to indicate the non-availability of the called party.

Two or more requesting or calling parties will occasionally transmit in the same slot and clash. If this happens, they will fail to hear an acknowledgement in the slot after the request, and will try transmitting RQS again using the Aloha protocol to choose the slot. The system controller detects that a clash has taken place, it can increase the Aloha number to reduce the probability of a second clash.

An example of an algorithm to calculate the Aloha number would be:

Keep an extra variable K (the auxiliary Aloha number), and update K as follows:
(a) If the previous slot was available for requests and was observed as "clashed", increase K by $n_1$, where for example $n_1=2$.
(b) If the previous slot was available for requests and was observed as successful (i.e. a message was successfully received), decrease K by $n_2$, where for example $n_2=1$, to a lower limit of 1.
(c) If the previous slot was available for requests and was observed as empty, decrease K by $n_3$, where for example $n_3=1$, to a lower limit of 1.
(d) If the previous slot was reserved for a message from a single user (e.g. a RDY message), leave K unchanged.

The Aloha number is then taken as K unless the system controller is transmitting an AHY message, in which case an Aloha number of 0 is sent.

FIG. 5 illustrates an example in which a call is requested, but no availability check on the called party is required. The GTC command serves as an acknowledgement to the calling party as well as an instruction to move to the given channel number, thus reducing the signalling overhead.

FIG. 6 illustrates an example in which a call is requested and heard by the system controller. However the request cannot be serviced immediately because the system is full or the called party is engaged and therefore an acknowledgement (ACK) is sent. As soon as a channel is available and both parties are free then the rest of the signalling for this call is sent.

The protocol used by the system in accordance with the present invention enables calls to be set-up both off-air and non off-air. Flow-charts illustrating how this can be done are shown in FIGS. 7 and 8.

In the illustrated flow charts it has been assumed that the messages contain the addresses of the appropriate parties.

Figure 7:
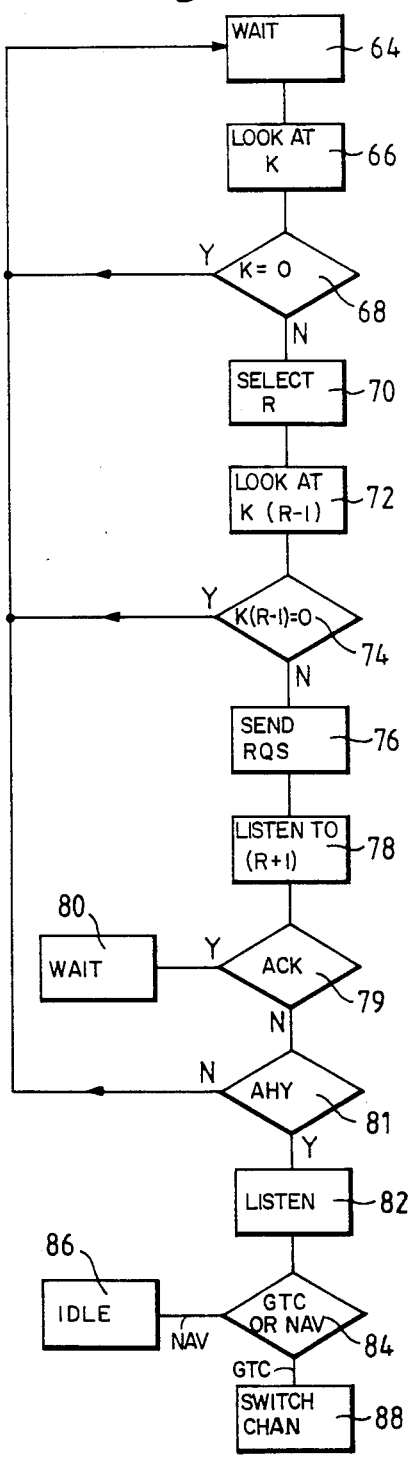
FIGS. 7 and 8 are flow-charts illustrating the various steps in off-air and non off-air call set up.
Figure 8:
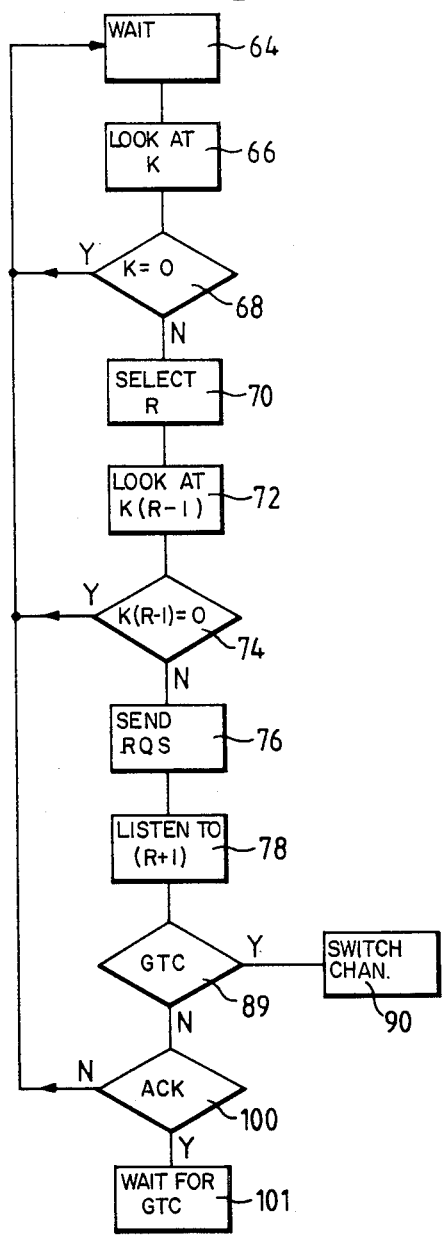

FIG. 7 shows the steps in off-air call set-up and enumerates the various steps in the call set up described with reference to FIG. 4. In FIG. 7 step 64 indicates waiting for a time slot, step 66 relates to looking at the Aloha number in the time slot and step 68 indicates the checking to see if the Aloha number is zero. If it is (Y), then one reverts to the step 64. If it is not (N) then the step 70 indicates selecting a slot number R, R being 1 or another number lying between 1 and the Aloha number noted in the step 66. The next step, step 72, is to examine the slot (R−1) and to check if the Aloha number is zero, step 74. If it is (Y) then one reverts again to the step 64. If it is not (N) then a request message is transmitted by a calling party, step 76. Step 78 signifies listening in the slot (R+1) for a signal from the system controller. Step 79 indicates checking if the signal is ACK, if it is (Y) then the calling party has to wait, step 80, until a speech channel is free. If it is not ACK (N) then a check is made to see if the signal is AHY, step 81. If it is not AHY (N) then one reverts to the step 64 but if it is (Y) then in step 82 one listens in following time slots and in step 84 ascertains if GTC or NAV is being transmitted. If it is NAV then one reverts to an idle state, step 86, but if it is GTC then in step 88 the calling and called parties switch to the designated speech channel.

It should be noted that a called party on hearing AHY addressed to him always replies in the next slot with RDY. This is shown in FIG. 4.

The flow-chart of FIG. 8 shows the sequence of steps in setting-up a call where there is no check on the availability of the called party. This is a similar situation to that disclosed in FIG. 5. The sequence of steps 64 to 78 of the flow-chart shown in FIG. 8 is the same as the steps 64 to 78 in the flow-chart of FIG. 7 and accordingly in the interests of brevity they will not be described again. At step 89 a check is made to see if the system controller is transmitting a GTC signal. If it is (Y) then step 90 denotes switching to the allocated speech channel. If the system controller is not (N) transmitting a GTC signal then in step 100 a check is made to see if the signal is ACK. If it is not (N) then one reverts to the step 64 and if it is (Y) then step 101 denotes waiting for a GTC signal and switching to the allocated speech channel in response to a GTC signal.

In implementing the present invention, the apparatus disclosed by C. K. Davis, P. J. Stein and R. F. Mitchell in "An Efficient and Flexible Trunking System for Mobile Radio" published in IEEE Communications '80—Communications Equipment and Systems, Conference Publication 184, Birmingham April 1980, pages 178 to 182, can be used with software modification.

We claim:

1. A time division multiple-access communication system comprising a plurality of transceivers and a system controller, in which communication between the system controller and the transceivers is effected in accordance with the following protocol:

continuous transmission by the system controller of framelength signals in successive time slots, each framelength signal including an Aloha number designating an updated number of immediately succeeding time slots which are available for signaling requests, whereby a calling transceiver seeking to signal the system controller can select any one of such available time slots at random;

a calling transceiver checking the time slot immediately preceding the selected time slot to ascertain the Aloha number of the selected time slot;

when the Aloha number of the selected time slot has a predetermined value, the calling transceiver reverting to listening for a time slot containing an Aloha number having other than said predetermined value;

and when the Aloha number of the selected slot has other than said predetermined value, the calling transceiver signalling the system controller in such selected time slot.

2. A communications system as claimed in claim 1, wherein said predetermined value of the Aloha number is 0.

3. A communications system as claimed in claim 1, wherein said system controller is adapted to transmit a message and a framelength signal including an Aloha number in the same time slots.

4. A communications system as claimed in claim 1, wherein the number of time slots in each frame is established by feedback control in accordance with the following algorithm:

keep an extra variable K as an auxiliary Aloha number, and based on an analysis of the number of clashes, empty slots and successful slots, update K as follows:

(a) if the previous slot was available for requests and was observed as "clashed", increase K by $n_1$, where n is an integer, (b) if the previous slot was available for requests and a request was successfully received therein, decrease K by $n_2$, K having a lower limit of 1 and $n_2$ being an integer, (c) if the previous slot was available for requests and was observed as empty, decrease K by $n_3$, K having a lower limit of 1 and $n_3$ being an integer, (d) if the previous slot was reserved for a message from a single specified transceiver, leave K unchanged;

the Aloha number is then taken as K unless the system controller is reserving the next slot for a single specified transceiver, in which case an Aloha number of 0 is sent.

5. A communication system as claimed in 1, wherein immediate collision-free communication with a single specified transceiver is embedded in the multi-access protocol, whereby communication between a calling transceiver and such specified transceiver can be immediately established by the system controller.

* * * * *